United States Patent [19]

Morrow et al.

[11] Patent Number: 4,913,095

[45] Date of Patent: Apr. 3, 1990

[54] FLUSHING SYSTEM FOR HOG HOUSES

[75] Inventors: Kenneth A. Morrow; Kelly Casey, both of Clarksville, Ark.

[73] Assignee: Tri-Systems, Inc., Clarksville, Ark.

[21] Appl. No.: 297,655

[22] Filed: Jan. 17, 1989

[51] Int. Cl.⁴ .............................................. A01K 1/01
[52] U.S. Cl. ...................................... 119/28; 119/16; 137/599
[58] Field of Search ............................. 119/16, 28, 27; 137/599

[56] References Cited

U.S. PATENT DOCUMENTS

| 2,825,300 | 3/1958 | Carlson | 119/16 |
| 3,119,373 | 1/1964 | Schmid | 119/28 |
| 3,137,270 | 6/1964 | Rigterink et al. | 119/28 |
| 3,530,831 | 9/1970 | Conover | 119/28 |
| 3,685,493 | 8/1972 | Weiland, Jr. | 119/28 |
| 3,905,394 | 9/1975 | Jerdle | 137/599 |
| 4,123,992 | 11/1978 | Laurenz | 119/16 |
| 4,191,215 | 3/1980 | Gonner | 137/599 |
| 4,207,919 | 7/1980 | Hutton | 137/599 |
| 4,208,279 | 6/1980 | Varini | 119/16 |
| 4,249,560 | 2/1981 | Rague | 137/240 |
| 4,256,057 | 3/1981 | Herring | 119/28 |
| 4,518,011 | 5/1985 | Stoll | 137/599 |

*Primary Examiner*—Paul J. Hirsch
*Attorney, Agent, or Firm*—Stephen D. Carver

[57] ABSTRACT

A reservoir system for storing and selectively outputting a large quantity of water for flushing animal wastes from adjacent hoghouses or other pens. An aboveground tank is provided with a plurality of water output orifices which are sealed against leakage by flexible seal plates adapted to be selectively opened and closed by flushing valves. Each of the flushing valves comprises a rigid, tubular valve guide sleeve mounted within the water output orifices. Each sleeve includes a plurality of vent mouths radially spaced apart about its lower base. An elongated, rigid piston fitted within each sleeve is controlled by a rigid rod which extends downwardly from a top-mounted crank assembly. The crank is driven by a motor actuated by a user-programmable timer circuit. When the motor is actuated the crank assembly rotates and raises the pistons, and water flows through the vent orifices, the output orifices, to be channeled onto the subfloor of the hoghouses. The force of inflowing water is effective to clear animal wastes from the hog house floor in a single flushing cycle. When the flushing cycle is complete, the timer is actuated to lower the crank assembly, so that the pistons come to rest within the guide sleeves. The resilient seals close to shut off the water output orifices and prevent leakage, so that the tank may be refilled for subsequent flushings.

17 Claims, 3 Drawing Sheets

FLUSHING SYSTEM FOR HOG HOUSES

BACKGROUND OF THE INVENTION

The present invention relates broadly to apparatus for automatic removal of animal wastes from enclosed animal shelters, such as barns, stables, and the like. More specifically, the present invention relates to a water reservoir system equipped with a multiplicity of valves for selectively outputting large uantities of water for flushing and cleaning stables. The present invention is believed best classified in U.S. utility class 119.

Through the years, a variety of systems have been developed to facilitate the removal of animal waste from enclosed shelters. One water-driven animal waste removal plant, commonly known as the Aegean system, was referenced centuries ago in the account of Hercules. In recent years, strict government health and disease control standards as well as the rising costs of animal care necessitate more effective and efficient waste disposal systems.

As will be appreciated by those experienced in working with livestock, modern animal shelters typically include some type of slatted or grated false floor which permits the animal wastes to fall through into sub-floor channels or gutters which can be more conveniently emptied or flushed. Representative of such floor structures are U.S. Pat. Nos. 386,997, issued to Logan on July 31, 1888; Herring, 4,256,057, issued Mar. 17, 1981; Barnidge et al., 4,048,960, issued Sept. 20, 1977; in U.S. Pat. Nos. 4,520,759, issued June 4, 1985 to Deters; and in 4,231,325, issued to Parks on Nov. 4, 1980. Another type of waste removal floor system known to us, of somewhat less relevance to the present invention, employs a movable floor scraper or scrubber device, such as those disclosed in U.S. Pat. Nos. 3,985,103 issued to Gallei on Oct. 12, 1976; and 4,123,992, issued Nov. 7, 1978 to Laurenz.

Removal of wastes from typical sub-floor systems is usually accomplished by scrapers or hydraulic pressure. Water supplied by a fountain, water sprayer head, wash apparatus, or gravity-flow flushing system may passes over or down the sub-floor surface. For example, Varani, U.S. Pat. No. 4,208,279, issued June 17, 1980, discloses a water sprayer system adapted to selectively floor the sloped floor surface. Hazen et al., U.S. Pat. No. 3,848,568, issued Nov. 19, 1974 teach the use of a siphon-type apparatus adapted to draw flushing fluids from an elevated tank.

One main disadvantage of such prior art flushing systems known to us is that they are not equipped to store and selectively disperse a sufficient quantity of water at one time to quickly and completely flush out the waste materials from the sub-floor systems. A single flushing is thus inadequate to achieve the desired cleanliness; multiple flushings are inefficient and costly. Hence it would seen desirable to provide a convenient system which has the ability to discharge a large volume of water very quickly.

As will be appreciated, it has long been known to employ valves for controlling the velocity and force of water flow from a tank or other similar reservoir. A variety of flushing valves have been described in the prior art. Prior art valves disclosed by Raque et al., U.S. Pat. No. 4,249,560 issued Feb. 10, 1981 and by Grenier, U.S. Pat. No. 3,586,042, issued June 22, 1971 employ pistons movable within a tubular housing for selectively opening and blocking side inlet ports. The earlier U.S. Pat. No. 2,953,154, issued to Agoliati et al. on Sept. 20, 1960 discloses a basic piston valve which can be selectively displayed upwardly either above or below a side fluid inlet conduit. Similarly, the piston valve disclosed by Marttinen, U.S. Pat. No. 4,249,561, issued Feb. 10, 1981 is driven within a tubular passageway to control fluid inflow from a multiplicity of side vents in the housing.

While such valves have proven effective and practical for smaller appications, no valve system known to us is capable of conveniently and quickly outletting a large quantity of fluid under pressure. In order to attain the desired result, it would appear beneficial to provide a water storage system operatively linked to a plurality of inlet valves which can be effectively used to quickly supply a large quantity of water adequate to complete a stall cleaning in a single flush cycle.

SUMMARY OF THE INVENTION

The present invention broadly comprises a system having large-volume reservoir adapted to quickly flush a large quantity of water to clean the sub-floor of a hog house or similar animal pen. The above-ground reservoir comprises a preferably concrete tank equipped with a plurality of automatically actuated cooperating valves for selectively flushing the pen at a user-selected time. Because the present system may be built of relatively inexpensive and readily available materials, the system is convenient, practical, well-suited for small industrial and farm use as well as in larger animal husbandry complexes.

The reservoir preferably comprises a box-like tank having four spaced-apart side walls, and is preferably positioned above ground upon a hollow foundation adjacent the hog house or houses which it services. A multiplicity of water output orifices defined through the floor of the tank in spaced-apart alignment feed into a system of subsurface conduits or pipes which channel into appropriate inlets in the subfloor of the animal pen. The orifices are selectively opened and closed by cooperating valve assemblies.

The valve assemblies comprise rigid, generally tubular valve guide sleeves preferably made of sections of PVC pipe. The sleeves are tightly fitted into the water output orifices and extending upwardly into the tank. A plurality of vent orifices are symmetrically spaced apart radially about the exposed base of each valve guide sleeve.

Each sleeve is thus adapted to slidably receive a valve piston. Each of the valve pistons comprises a rigid, generally planar, disk-like piston head, preferably made of hard rubber or similar material. The piston head is adapted to slide easily up and down within the sleeve interior and rest upon the surface of a flexible, watertight seal positioned within the bottom of the sleeve. Each piston head is semi-permanently mounted upon the end of an elongated, rigid piston rod. The piston rods extend upwardly out of the guide sleeves to the top of the tank, where they are pivotally mounted upon rigid arms of a rotatable crank assembly.

The crank assembly is mounted within a rigid, elongated framework which extends between two opposing side walls across the top of the tank. The framework operatively supports a generally cubical motor housing adapted to safely shelter the drive mechanism for the valve assemblies.

The drive mechanism preferably comprises a conventional AC motor and a timer system which can be set by the user. Thus, at the prescribed, user-selected time, the timer automatically actuates the motor to rotate the crank assembly. When the crank assembly is engaged, the piston rods are lifted, which in turn raises the piston heads within the valve guide sleeve. When the piston heads are raised, water stored in the tank rushes through the vent orifices into the sleeves, forcing the flexible seals are to open. The water is then channeled through the foundation via the subsurface pipes onto the hog house subfloor. Thus a large amount of water under relatively high pressure may be rapidly outlet from the tank to flush the waste from the subfloor. Because the water output pressure is so great, it has been found that the subfloor can be effectively cleaned in a single flushing cycle. When the flushing cycle is complete, the crank assembly again lowers the piston heads to close the seals and block the water output orifices, so that the tank can be refilled via conventional water inlet lines.

Hence it is a broad object of the present invention to provide an improved animal waste flushing system for use in hog houses or similar shelters.

A similar board object of the present invention is to provide a flushing system for hog houses which delivers a large amount of water under pressure to effectively clean animal wastes from the floor or sub-floor in a single flushing cycle.

Still another broad object of the present invention is to provide a hog house flushing system which can be automatically activated at a selectively desired time predetermined by the user by means of an electromechanical timer circuit.

A further object of the present invention is to provide a flushing system of the nature described which simultaneously activates a plurality of valves to effectuate a high-speed, high-pressure flush to quickly clean a floor of a hog house.

Another object of the present invention is to provide a hog house flushing system of the character described which can be conveniently positioned proximate a plurality of hog houses to be cleaned. It is an advantageous feature of the present invention that it incorporates materials and components which are relatively inexpensive and readily available for use in a farm or small industrial environment.

A similar object of the present invention is to provide a self-contained animal waste disposal system which includes a large-volume water reservoir such as a septic tank or the like.

Still another object of the present invention is to provide a hog house flushing system of the nature described which incorporates an improved water outlet valve assembly.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
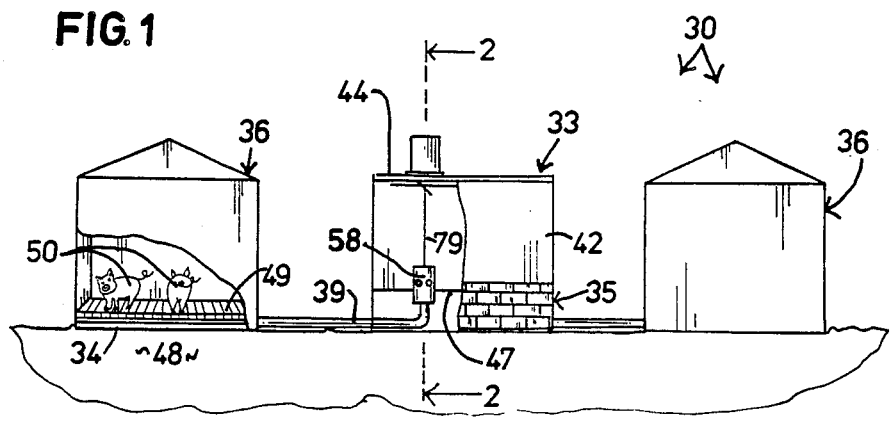
FIG. 1 is a fragmentary pictorial view illustrating the best mode of my FLUSHING SYSTEM FOR HOG HOUSES in position for servicing a plurality of hog houses.
Figure 2:
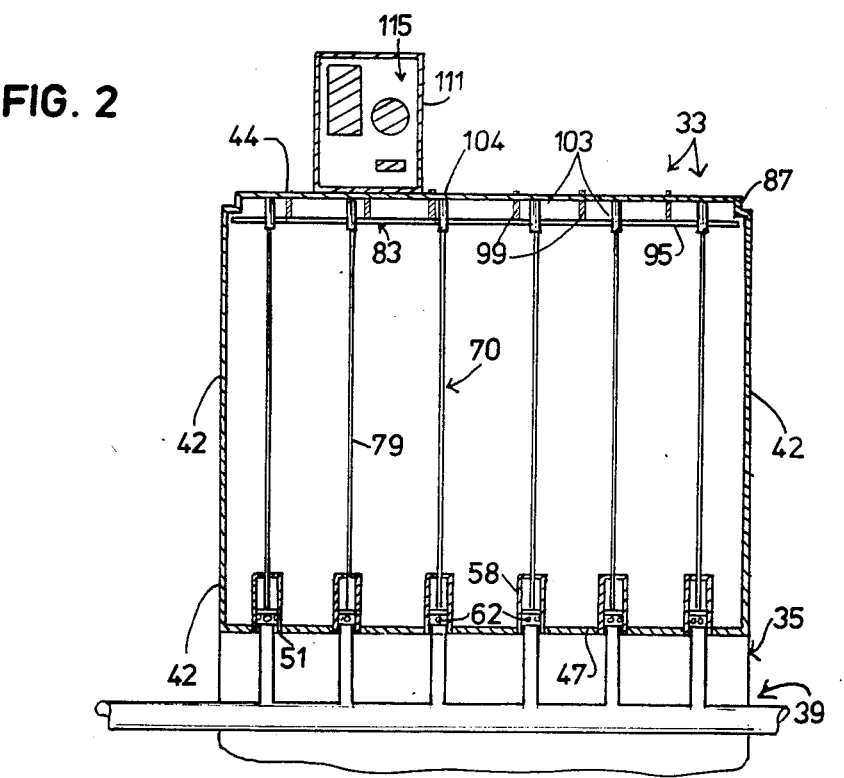
FIG. 2 is a fragmentary sectional view of a preferred reservoir, taken generally along line 2—2 of FIG. 1.

With initial reference directed to FIGS. 1 and 2 of the appended drawings, the best mode of our flushing system is illustrated in use in conjunction with a plurality of animal pens for housing hogs, calves, or the like. The reservoir system broadly comprises an above-ground tank for temporarily storing and selectively outputting a large quantity of water for flushing animal wastes from the pens. The flushing system broadly comprises a plurality of motor-driven, mechanical piston assemblies adapted to simultaneously, selectively open and close water output orifices defined through the bottom of the water tank. Water released through the output orifices is delivered under relatively high pressure via subsurface pipes and flushed across the subfloor of the animal pen to clean away animal wastes.

The flushing system, broadly designated by the reference numeral 30, comprises a rigid reservoir 33 which is elevated above-ground upon a hollow foundation 35 comprised of brick, concrete, or the like, and positioned adjacent one or more animal pens 36 to be cleaned. Reservoir 33 comprises a box-like, preferably concrete tank structure such as a septic tank or the like having a multiplicity of spaced-apart solid side walls 42, a top 44, and an opposing bottom 47. A plurality of water output orifices 51 defined through bottom 47 of the tank operatively connect the reservoir 33 to the subfloor 34 of animal pens 36 via a system of conduits 39 preferably comprising PVC pipes or similar material. Conduits 39 thus originate at orifices 51, pass through foundation 35 and over the surface of the ground 48, and are channeled into the hoghouse subfloor 34. The system conduits 39 thus do not contact the elevated false floor 49 and thus do not interfere with regular movement of the livestock 50 within the pens 36.

Figure 5:
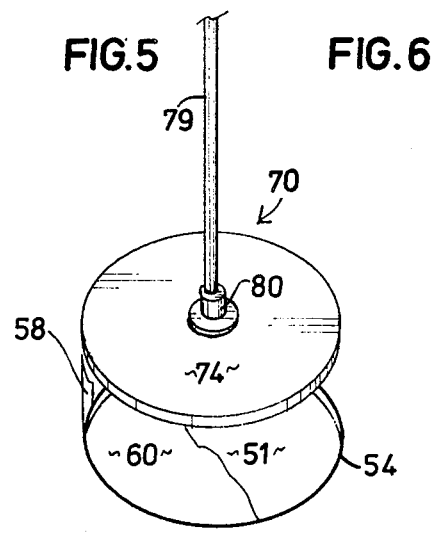
FIG. 5 is an enlarged scale, fragmentary, isometric view of the preferred valve sleeve thereof.
Figure 6:
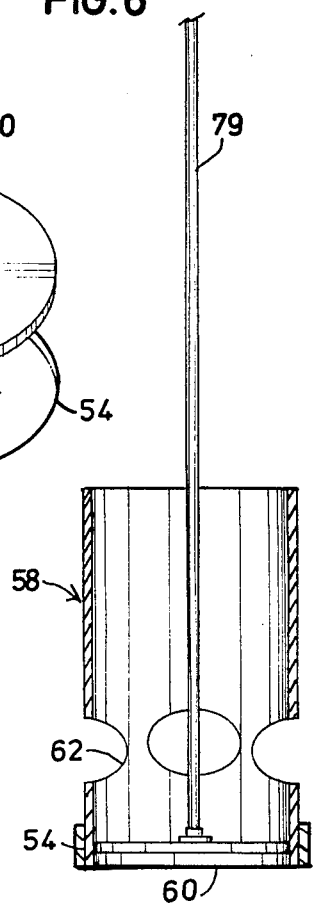
FIG. 6 is a sectional view taken generally along line 6—6 of FIG. 5, illustrating the piston assembly in a first, lowered position, the arrows indicating the path of water flow about the piston assembly.
Figure 7:
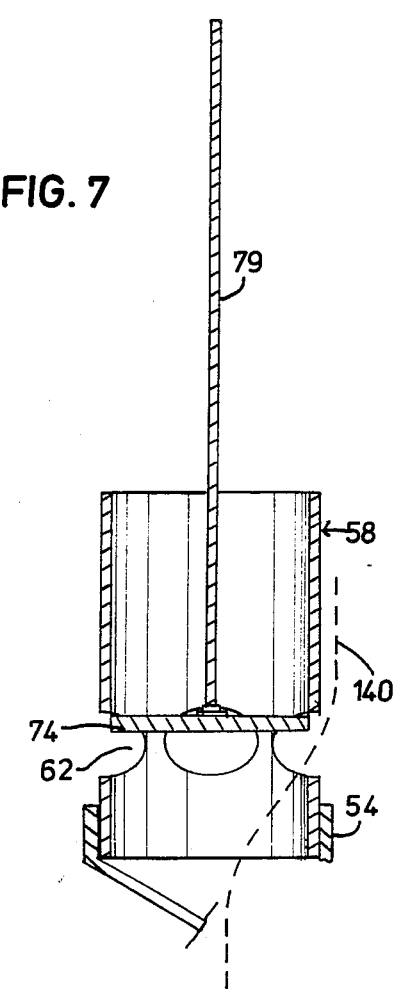
FIG. 7 is a similar sectional view illustrating the piston in a second, raised position, the arrows indicating the path of water flow about the piston assembly.

With specific reference directed to FIGS. 5-7, output orifices 51 are lined with a rigid collar 54, preferably comprised of portions of PVC pipe. Each of the collars 54 is adapted to secure an elongated, tubular valve guide sleeve 58 preferably constructed of roughly one-foot sections of PVC pipe. In the best mode, sleeves 58 extend roughly eight to ten inches upwardly from output orifices 51 into tank 33. Each of collars 54 terminates in a flexible, generally planar seal 60 preferably comprised of a flat expanse of PVC material or the like which seals orifice 51 and prevents undesired intermittent leakage of water into conduits 39.

Figure 4:
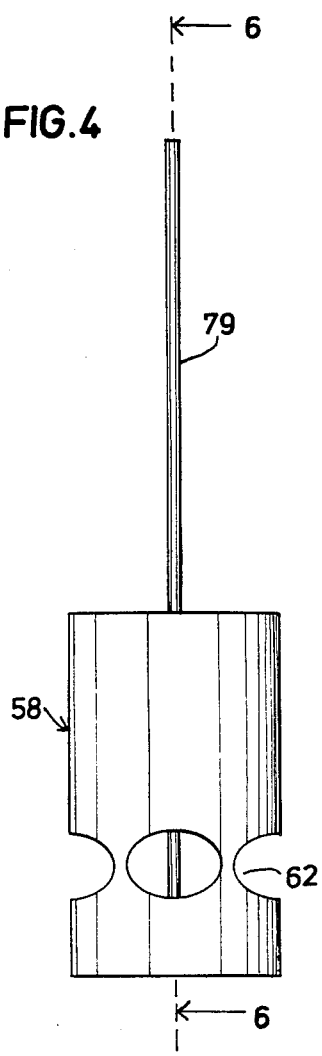
FIG. 4 is an enlarged scale, fragmentary view of the preferred piston head thereof.

As best illustrated in FIGS. 4, 6, and 7, a plurality of vent mouths 62 is defined radially about the base of each valve sleeve guide 58. In the best mode, vent mouths 62 are of generally circular configuration and are roughly one to two inches in diameter.

The flow of water through output orifices 51 is controlled by a plurality of piston assemblies broadly designated herein by the reference numeral 70. As best viewed in FIGS. 5 and 6, each of piston assemblies 70 comprises a rigid circular piston head 74 semi-permanently mounted upon the end of an elongated rigid piston rod 79. Piston head 74, preferably comprised of a disc of hard rubber or similar material, is threadably mounted upon rod 79 by a screw post 80, whereby it may be conveniently removed and replaced in the event it becomes damaged. Piston head 74 is slidably received within sleeve 58 and is adapted to rest upon the upper surface of seal 60 to block output orifice 51 as best illustrated in FIG. 6.

Figure 3:
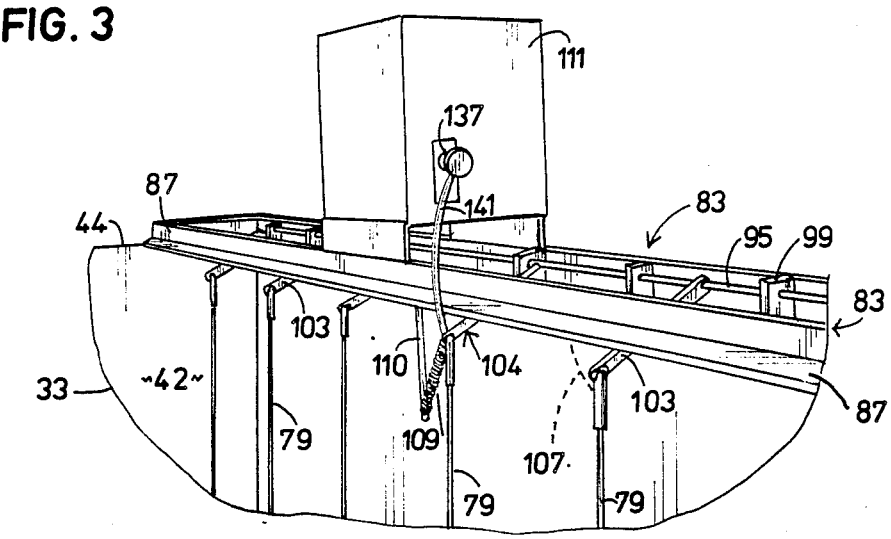
FIG. 3 is an enlarged scale, fragmentary isometric view, illustrating the preferred crank assembly thereof.

With reference now to FIGS. 2 and 3, piston rods 79 extend upwardly from piston heads 74 through tank 33 and are pivotally mounted at their upper end to a rotatable crank assembly broadly desiganted by the reference numeral 83. Crank assembly 83 comprises an elongated, generally rectangular frame 87 which extends across the top of tank 33 between opposing side walls 42 to support a rigid head bar 95. Header bar 95 is secured for rotation within frame 87 upon rigid tabs 99. Header bar 95 supports a multiplicity of spaced-apart crank arms 103 and a central crank arm 104. One of the piston rods 79 is pivotally mounted upon each crank arm 103, 104. When header bar 95 rotates as described in detail below, crank arms 103, 104 are selectively raised or lowered simultaneously along an arc of roughly forty-five to sixty degrees generally designated by the reference numeral 107. Piston heads 74 are thus lifted or lowered within guide sleeves 58 to selectively open and close water outlet orifices 51. The limits of arc 107 are defined by the limits of contraction and expansion of spring 109, which is secured at one end to central crank arm 104 and at its opposite end to rigid member 110, which extends downwardly from frame 87.

Figure 8:
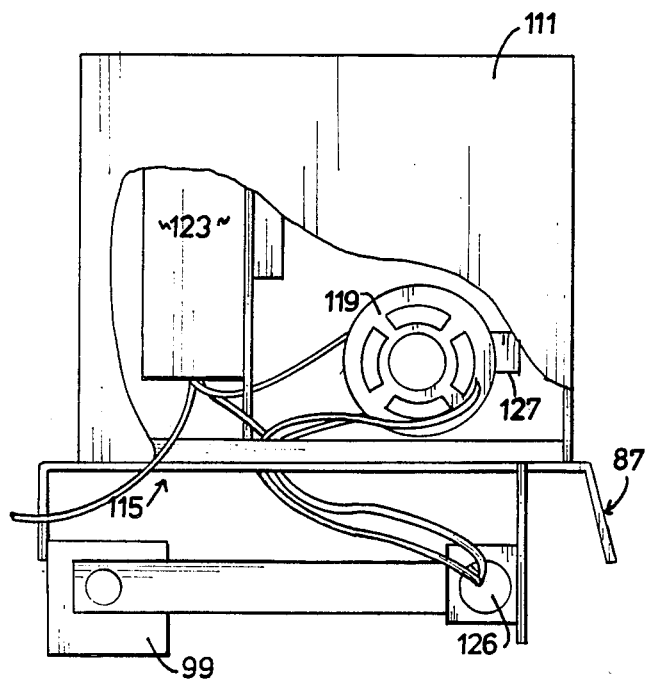
FIG. 8 is a fragmentary, front elevational view of the preferred motor housing thereof, portions thereof being broken away for clarity; and, FIG. 9 is a simplified block diagram of the preferred timer circuit.
Figure 9:
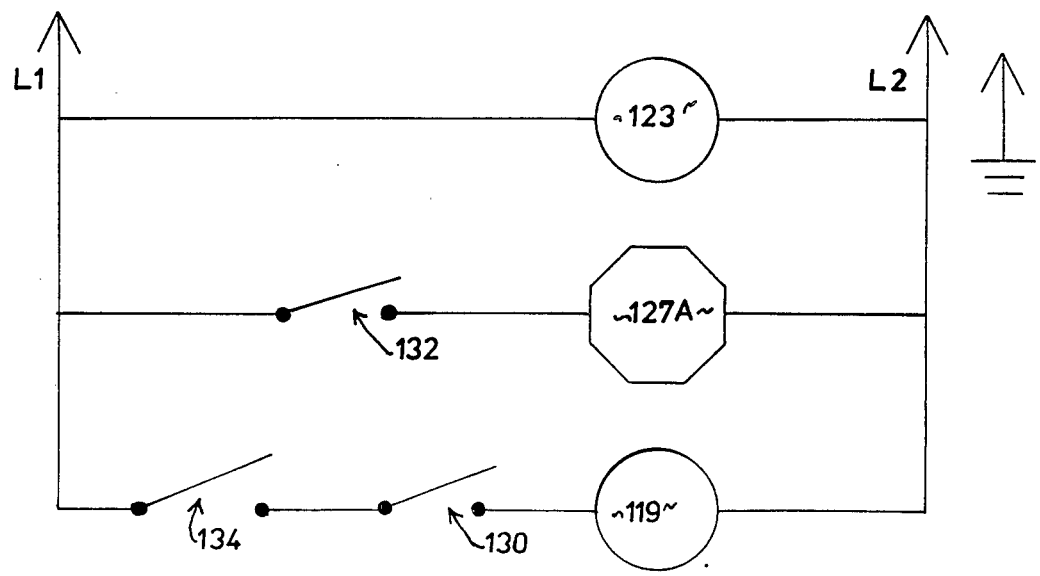

Frame 87 also supports a generally cubical motor housing 111. Housing 111 extends upwardly above the top of tank 33 (FIGS. 1–3) and is adapted to securely enclose the control mechanism of the present invention, broadly designated by the reference numeral 115. With reference to FIGS. 8 and 9, control mechanism 115 comprises a conventional 120-Volt AC motor 119 such as a Dayton Gear Motor provided with a solenoid-operated brake 127. Motor 119 is connected to a conventional 96-pin electrical-mechanical timer device 123, such as a Tork Model No. 8001 via a conventional limit switch 126, such as a General Electric with a "cat whisker"-type operator. Timer 123 is adapted to be manually set by the user to actuate motor 119 at a desired user-selected time. As described in detail in the operational section which follows, system 30 is controlled by selective engagement of the components of the control mechanism 115 by switches 130, 132, and 134.

OPERATION

A flush cycle may only be effectuated when reservoir 33 is full of water. A fill mode is first effectuated to attain the desired water level in the reservoir. To effectuate a flush, water is released under extremely high pressure through output orifices 51 and channeled into the subfloor of pens 36 via conduits 39.

Fill Mode

Timer 123 is first actuated to close switch 132, whereby solenoid 127A releases the brake mechanism 127 to stop rotation of shaft 137. When further rotation of shaft 137 is braked, crank arms 103, 104 are lowered, whereby to lower piston heads 74 within sleeve guides 58 below the level of vent mouths 62, as illustrated in FIG. 6. As piston heads 74 come to rest at the base of collar 54, seals 60 are resiliently urged to their closed, sealed position to prevent water from leaking into conduits 39. Simultaneously, switch 134 is opened and automatically shuts off motor 119. When the tank is thus sealed closed, water is inlet from the water supply system (not shown) to fill the tank for a flush.

Flush Mode

At the onset of the flush mode, timer 123 actuates at the user-selected time to open switch 132 to de-energize solenoid 127A. Simultaneously, switch 134 is closed, whereby motor 119 is started (FIG. 9). As illustrated in FIG. 3, drive shaft 137 of motor 119 extends through the wall of shroud 111 and is operatively connected via line 141 to the central crank arm 104. When motor 119 is actuated, shaft 137 rotates and lifts central crank arm 104 upwardly along arc 107 to the expansion limit of spring 109. As central crank 104 is lifted, it engages header bar 95 to simultaneously lift crank arms 103. When the crank arms are thus elevated, piston rods 79 raise piston heads 74 within sleeves 58.

As best illustrated in FIGS. 5 and 7, head 74 is raised above the level of vent mouths 62, whereby to permit water from the tank to rush into mouths 62 along the pathway defined by reference numeral 140. The incoming water enters the interior of sleeve 58 and forces open seal 60 to open water input orifices 51. A large quantity of water then rushes under extreme pressure into conduits 39 and is channeled in to pens 36 to flush the waste from the subfloor. When the flush cycle is complete, limit switch 126 automatically actuates to open switch 130 and stop motor 119.

In the best mode, the conventional septic tank comprising reservoir 33 provides an adequate volume of water to produce a flushing pressure sufficient to quickly and conveniently flush all animal wastes from the floor in a single flushing cycle. Repeated flushings are generally not necessary. Thus, assembly 33 has proven to be extremely efficient, sense it eliminates waste of running water and additional labor requirements.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A reservoir system for storing and selectively outputting water for selectively flushing and cleaning the subfloor of stables, pens and the like, said reservoir system comprising:

rigid tank means for containing a large volume of water, said tank means having a top, a bottom, a plurality of side walls, and a plurality of output orifices defined in said bottom;

valve means for selectively outputting water stored within said tank means through said output orifices, said valve means comprising:

piston means for selectively controlling the release of water, said piston means operable to block and unblock said output orifices;

valve guide means associated with said output orifices for controlling piston means movement relative to said output orifices; and, means for selectively actuating said valve means.

2. The system as defined in claim 1 including resilient seal means for providing a water-tight seal to prevent leakage through said output orifices.

3. The system as defined in claim 1 wherein said valve guide means comprises:

a plurality of tubular members associated with said output orifices, each of said tubular members substantially axially aligned with respect to said output orifices and adapted to slidably receive said piston means;

mouth means defined within said valve guide means for admitting water through said valve guide means and through said output orifices in response to selective actuation of said valve means.

4. The system as defined in claim 3 wherein said piston means comprises a plurality of rigid, elongated, generally cylindrical pistons, each of said pistons operatively connected to an elongated piston rod extending generally coaxially upwardly from said piston through the interior of said valve guide means; and, said system comprises crank means for selectively actuating said pistons in synchronization.

5. The system as defined in claim 4 wherein said mouth means comprises a plurality of orifices radially spaced apart about the lower periphery of said valve guide means.

6. The system as defined in claim 4 wherein said valve guide means comprises PVC tubes.

7. The system as defined in claim 4 including motor means for selectively actuating said crank means means to open and close said valve means.

8. The system as defined in claim 4 wherein said tank means comprises an enclosed, above-ground concrete septic tank adapted to be elevated upon a ridig foundation and located proximate said stable, pen or the like, said tank being connected in fluid flow communication with said stable or the like via a plurality of above-ground conduits.

9. The system as defined in claim 2 wherein said seal means comprises flexible portions of flat PVC operatively secured within said water output orifices.

10. The system as defined in claim 4 wherein said means for actuating said valve means comprises:
motor means for driving said crank means;
timer circuit means for automatically actuating said system at a user-selective desired time; and,
brake means for inhibiting rotation of said crank means.

11. A self-cleaning animal enclosure system for housing farm animals such as hogs, calves, or the like, said system comprising:

at least one house comprising multiple spaced-apart outer walls, a roof structure, and a floor structure, said floor structure comprising a channeled subfloor adapted to receive animal waste;

reservoir means for at least temporarily storing a large quantity of water for selectively flushing and thereby cleaning said subfloor, said reservoir means comprising:

tank means for containing a large volume of water, said tank means having a top, a bottom, and a plurality of interconnected side walls;

water output orifice means defined in said bottom of said tank means for releasing water under pressure from said tank; and, valve means for selectively outputting said water through said output orifices;

channel means for operatively connecting said reservoir means to said animal houses;

water supply means for supplying said reservoir means; and, means for actuating said valve means.

12. The shelter system as defined in claim 11 wherein said valve means comprises:

piston means for selectively controlling the release of water, said piston means operable to block and unblock said output orifice means; and, valve guide means associated with said output orifices for controlling piston means movement relative to said output orifices, said valve guide means comprising:

a plurality of tubular sleeves associated with said output orifices, each of said sleeves substantially axially aligned with respect to said orifices and adapted to slidably receive said piston means;

vent means defined within said valve guide means for admitting water through said valve guide means and through said output orifices in response to selective actuation of said piston means and thus said valve means.

13. The system as defined in claim 12 wherein said piston means comprise a plurality of rigid, elongated, generally cylindrical piston heads operatively connected to elongated piston rods extending upwardly from said piston heads through said valve guide means.

14. The system as defined in claim 13 wherein said vent means comprises a plurality of orifices radially spaced apart about a lower base of said valve guides.

15. The system as defined in claim 14 wherein said valve means comprises crank means for selectively raising and lowering said piston means in synchronization, motor means for actuating said crank means, and timer circuit means for selectively actuating said motor means.

16. The system as defined in claim 14 wherein each of said valve guides comprises:

a generally cylindrical, tubular sleeve extending upwardly in substantially axial alignment from one of said water output orifices;

wherein each of said sleeves is adapted to slidably receive one of said piston heads; and a plurality of water inlet vent ports defined radially about the base of said valve guide sleeves to selectively admit water from said tank into said outlet orifices in response to actuation of said piston means.

17. The system as defined in claim 16 wherein said valve guide means comprise PVC tubes.

* * * * *